United States Patent [19]

Gorlov

[11] Patent Number: 5,074,710
[45] Date of Patent: Dec. 24, 1991

[54] WATER GATE ARRAY FOR CURRENT FLOW OR TIDAL MOVEMENT PNEUMATIC HARNESSING SYSTEM

[75] Inventor: Alexander M. Gorlov, Brookline, Mass.

[73] Assignee: Northeastern University, Boston, Mass.

[21] Appl. No.: 697,209

[22] Filed: May 8, 1991

[51] Int. Cl.[5] .................... E02B 9/00; E02B 9/08; F03B 13/12
[52] U.S. Cl. .................... 405/76; 60/370; 60/398; 290/53; 290/54
[58] Field of Search .................... 405/75–78; 60/370, 398; 290/42, 43, 52, 53, 54; 417/330, 334

[56] References Cited

U.S. PATENT DOCUMENTS

| | | | |
|---|---|---|---|
| 2,715,366 | 8/1955 | Vartiainen | 405/76 X |
| 4,095,423 | 6/1978 | Gorlov | 405/76 X |
| 4,103,490 | 8/1978 | Gorlov | 60/398 |
| 4,152,895 | 5/1979 | Wirt | 60/398 |
| 4,206,601 | 6/1980 | Eberle | 60/398 |
| 4,211,077 | 7/1980 | Cassidy | 60/398 |
| 4,251,991 | 2/1981 | Wood | 60/398 |
| 4,265,599 | 5/1981 | Morton | 417/54 |
| 4,309,152 | 1/1982 | Hagen | 417/218 |
| 4,408,454 | 10/1983 | Hagen et al. | 60/500 |
| 4,441,030 | 4/1984 | Bellamy | 290/53 |
| 4,448,020 | 5/1984 | Wood et al. | 60/398 |
| 4,464,080 | 8/1984 | Gorlov | 405/76 |
| 4,675,536 | 6/1987 | Bellamy | 290/42 |
| 4,781,023 | 11/1988 | Gordon | 60/506 |
| 4,782,663 | 11/1988 | Bellamy | 60/398 |

FOREIGN PATENT DOCUMENTS 215907 10/1987 Japan .................... 405/76

OTHER PUBLICATIONS

A Novel Approach to the Explotation of Tidal Energy Report to the U.S. Department of Energy, V1-Summary and Discussions, Dec., 1981, Gorlov, Alexander M.
"The Wells Turbine" (promotional information) Hydro Energy Associates Limited, Glos. GL50 3DA, and, Coventry Lanchester Polytechnic, Energy Systems Group, Coventry, CV1 5FB, England.

Primary Examiner—Dennis L. Taylor
Assistant Examiner—John Ricci
Attorney, Agent, or Firm—Weingarten, Schurgin, Gagnebin & Hayes

[57] ABSTRACT

The invention, which provides a system for harnessing power from current flow or tidal movement in a body of water, comprises first and second hydro-pneumatic chambers each having ingress and egress below the water surface near the river or ocean floor and water gates operative to open or seal the ports to the passage of water. In an exemplary embodiment, the gates are sychronized by shafts so that the ingress ports of each chamber are connected to the egress ports of each other chamber. Thus, one set of gates is closed, while the other is open, thereby allowing water to flow into one chamber and build air pressure therein and allowing water to flow out of the other chamber and create a partial vacuum therein. A pipe connects the chambers, and an air turbine harnesses the air movement within the pipe. When water levels are equilibrated, the open set of gates is closed by a counterweight, and the other set is allowed to open by natural force of the water differential. The water gates may be comprised of a plurality of louvers which are ganged for simultaneous opening and closing. The system is designed to operate with air turbines or other pneumatic devices. Its design minimizes construction cost and environmental impact, yet provides a clean renewable energy source.

23 Claims, 9 Drawing Sheets

WATER GATE ARRAY FOR CURRENT FLOW OR TIDAL MOVEMENT PNEUMATIC HARNESSING SYSTEM

FIELD OF THE INVENTION

The invention relates to systems for deriving useful power from current flow or tidal motion in water bodies, and in particular to an apparatus having hydropneumatic chambers and water gates.

BACKGROUND OF THE INVENTION

Systems for utilizing tidal motion and current flow of oceans and rivers are known. Such systems usually require a dam or other physical structure which separates one part of a water body from another part. A difference in water levels is thereby created which provides a pressure differential useful for driving mechanical devices as hydroturbine generators.

Conventional hydroturbine technology, involving the necessity of positioning a powerhouse in a dam body with turbines located below the lowest water surface, has been applied at large river and waterfall sites. However, the hydroenergy potential of thousands of small rivers and river canals remain untapped because hydroturbines, as an economical and practical matter, do not operate effectively with a low water head, in other words, when water level differences are about three meters or less. Hydroturbines need significant water depth for installation and cost-efficient operation. Consequently, powerhouses which contain the hydroturbines must be installed in large and complicated dam structures capable of withstanding the enormous water pressures generated.

Systems for harnessing the energy in ultra low water heads (less than three meters) and in smaller scale systems employing pneumatic turbines and devices are also known. In U.S. Pat. No. 4,103,490, issued to the same inventor as herein, a single tidal chamber is utilized in which a housing is mounted on the ocean bed with ports of ingress and egress near the bottom or lower part of the housing, through which tidal waters may flow. Positive air pressure is built up in the housing by rising tides, and partial vacuums are created by falling tides. The positive air pressure or partial vacuum at the top of the housing is connected through auxiliary high pressure and low pressure chambers to a two-state revolving valve having two input ports and two output ports. The output ports may be connected to a reciprocating air motor so that low level energy in the last one foot or so of the tide may be made to do useful work.

In U.S. Pat. No. 4,095,423, also issued to the same inventor, a similar system is described in which a dam structure is used, but an air valve rather than a water valve is employed.

In U.S. Pat. No. 4,464,080, also issued to the same inventor as herein, an apparatus is described for utilizing power generated by rising and falling tides or by flowing currents. A single cavity chamber contains a high volume gating system in which water is cyclically gated from the high water level on one side of a dam, through the single cavity chamber, to the lower water level on the other side of the dam, alternately providing positive air pressure and a partial vacuum within the single chamber. Air pressure variations are used for driving an air motor. In one embodiment, the chamber comprises a barrier at the chamber bottom which divides the bottom of the chamber in half, large ports on either side of the barrier to permit alternative inflow and outflow of high volumes of water, and mechanically operated sets of sluice gates for selectively opening and sealing different sets of ports. Also disclosed are vertical sluice gates that are automatically activated by their own weight and water pressure.

The present application represents a patentable development of the concept of using an air engine to harness hydropower. This concept was formulated by the Applicant in U.S. Pat. Nos. 4,095,423; 4,103,490; and 4,464,080 described above.

A double-box system has been devised at the Coventry Polytechnic Institute, England, which is comprised of a butterfly- or figure-eight-shaped pair of hydropneumatic chambers which are connected together by a diverting vertical valve. Upstream water flows against one side of the figure "8" and is diverted into one of the chambers, while water in the other chamber is allowed to flow into downstream water on the other side. The valve is a vane which pivots on a vertical axis to control the water input and output of the two chambers. Switching the valve causes the chambers to fill and empty alternatively which drives air through a turbine coupled to an electric generator to produce electric power. However, this double box system requires an external mechanical drive to switch the diverting valve. The drive must provide sufficient torque to overcome the inertia of the valve as well as of the swept water and suction forces generated. The torque must also be sufficient to switch the valve in seconds, so as to maintain the water level gradient created between the two chambers, and can therefore consume considerable output power. The mechanical complexity of the valve and drive system gives rise to reliability problems. Even if automatic switching mechanisms can be adapted to the vertically-pivoting diverting gate, the use of such a gate does not permit high volumes of water to be processed because the large gates required for processing large volumes of water have greater inertia and water resistance, thereby increasing cycle times. Because a single vertical gate is used for both chambers, unavoidable loss of water and potential energy arises due to direct leakage of the water flow out of both chambers when the gate is in an intermediate position. These characteristics disfavor application of such a gate design to a harnessing system intended for use with low water heads.

SUMMARY OF THE INVENTION

The invention provides an apparatus for harnessing energy from current flow or tidal movement in waterbodies, including those affording small water heads such as rivulets and creeks. An exemplary apparatus comprises four vertical walls connected together about a common vertical axis to form a general X-shape. One pair of opposed quadrants defined thereby are enclosed to form chambers. The other pair of opposed quadrants confront and separate water bodies as a barrier or as part of a barrier between a higher water level and a lower water level, such as between upstream water and downstream water. Each wall contains a sealable underwater port to permit water to flow into and out of the chambers. In each port, a water gate or array of louvers is rotatable with respect to a horizontal axis between two positions and operable to permit sealing of the port or flowing of water through the port. Gates of diagonally opposite walls are coupled through the orthogonal walls by a common shaft. Cross-coupled gates are thereby provided for the synchronized, but alternating, filling and emptying of the two chambers. When a first cross-coupled set of gates is open, the second cross-coupled set of gates is closed; thus, upstream water enters a first chamber while water in the second chamber exits into downstream water. When water levels in each chamber are the same as respective levels of the upstream water and downstream water to which they are connected, the first set of gates is closed by a counterweight on the coupling shaft and the second set of gates is urged to an open position by water pressure. Upstream water begins entering the second chamber while water in the first chamber exits into downstream water. When water levels in the chambers are the same as respective levels of the upstream or downstream water to which they are connected, the second set of gates is urged to a closed position by a counterweight on the coupling shaft and the first set of gates is reopened. The cycle is then repeated.

As sets of cross-coupled gates open and close in alternation, the air pressure and the partial vacuum which successively build up in see-saw fashion between the chambers fluctuates rapidly. The chambers are connected to each other by a pipe or channel through which an air jet moves. This quick air pressure movement, doubled by the chamber-to-chamber action, drives an air turbine combined with an electric generator. In a further embodiment, each gate comprises a synchronized plurality of small louvers connected in a jalousy arrangement which avoids the cumbersome inertia of large doors and permits large volumes of water to pass through the system. The invention provides efficient energy conversion where the water head is extremely low and the natural flow of the water course is intended to be left undisrupted. Further features and advantages of the invention are discussed hereinafter.

DESCRIPTION OF THE DRAWINGS

The invention will be more fully understood from the following detailed description taken in conjunction with the accompanying drawings in which.

DETAILED DESCRIPTION OF THE INVENTION

As shown by the exemplary embodiments in the drawings, the invention provides a current flow or tidal motion harnessing system that can be used in oceans, lakes, rivers, creeks, and in any other body of water in which a pressure differential can be created by separating a higher level of water from a lower level of water, a water level differential known as a "water head." The invention has applications in large bodies of water, such as oceans, and may be used in conjunction with an elongated flexible barrier to create separations of water during tidal movements. It is especially useful in small rivers, rivulets, or creeks having ultra low water heads, because the scale of the apparatus design does not adversely affect the efficiency of the design. Moreover, the ability of the system to pass large volumes of water without requiring a large water head is environmentally advantageous because it avoids the need to build a large upstream water reservoir. In this manner, land area is protected against substantial flooding. Furthermore, damage to fish and other animals is decreased in the absence of water turbines and the dam body.

Figure 1:
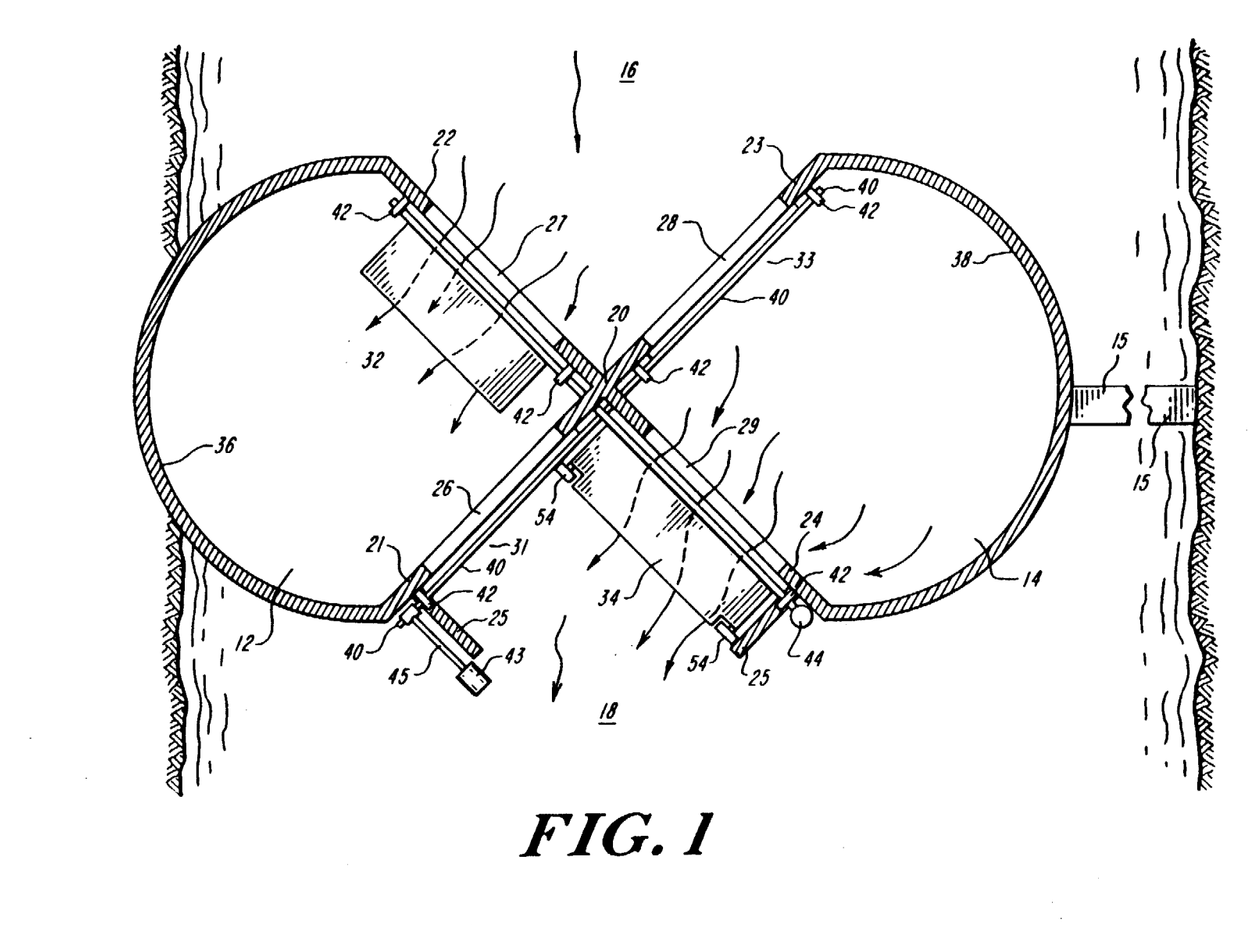
FIG. 1 is a top diagrammatic view of the hydro-pneumatic chambers with cross-coupled water gates in an exemplary embodiment of the invention.

FIG. 1 shows a top diagrammatic view of an exemplary embodiment of the water gate system of the invention situated in a body of water, such as a river, which has been separated into a higher water level 16 and lower water level 18. The physical structure of the system 10, comprised of a housing for a first hydro-pneumatic chamber 12 connected to a housing for a second hydro-pneumatic chamber 14, may itself be used as a barrier to create the water level differential 16/18, or used in conjunction with a separate barrier 15. The housings of the chambers 12 and 14 are defined in part and separated by a first vertical wall 21, a second vertical wall 22, a third vertical wall 23, and a fourth vertical wall 24 connected together about or around a vertical axis 20. Each of these vertical walls 21, 22, 23, and 24 contains, respectively, water ports 26, 27, 28, and 29 located beneath the lowest water level to permit water to flow through the walls. The system further comprises water gates 31-34 which are rotatable, with respect to a horizontal axis, on shafts, pivots, or hinges between open and closed positions and operative to allow water to flow through respective ports 26-29 or to seal them against water flow. A plastic or rubber seal, such as the kind used for refrigerator doors, may be used to provide further sealing between the port openings and watergates.

Preferably, the water ports 26-29 should be located near the bottom of the chambers 12 and 14 and as close to the floor or bed of the river, ocean, or waterway as possible. This will allow the system to be used even when the overall surface level of the water is relatively low.

Figure 2:
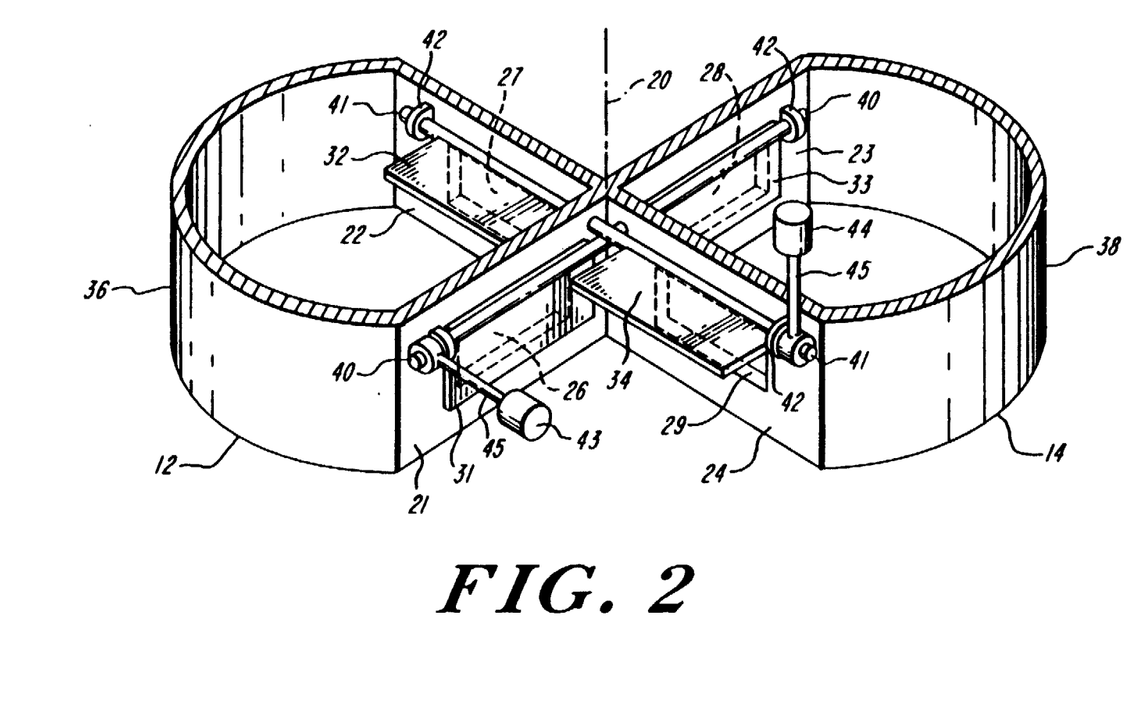
FIG. 2 is a cut-away perspective view showing the bottom of the chambers and gates of FIG. 1.
Figure 3:
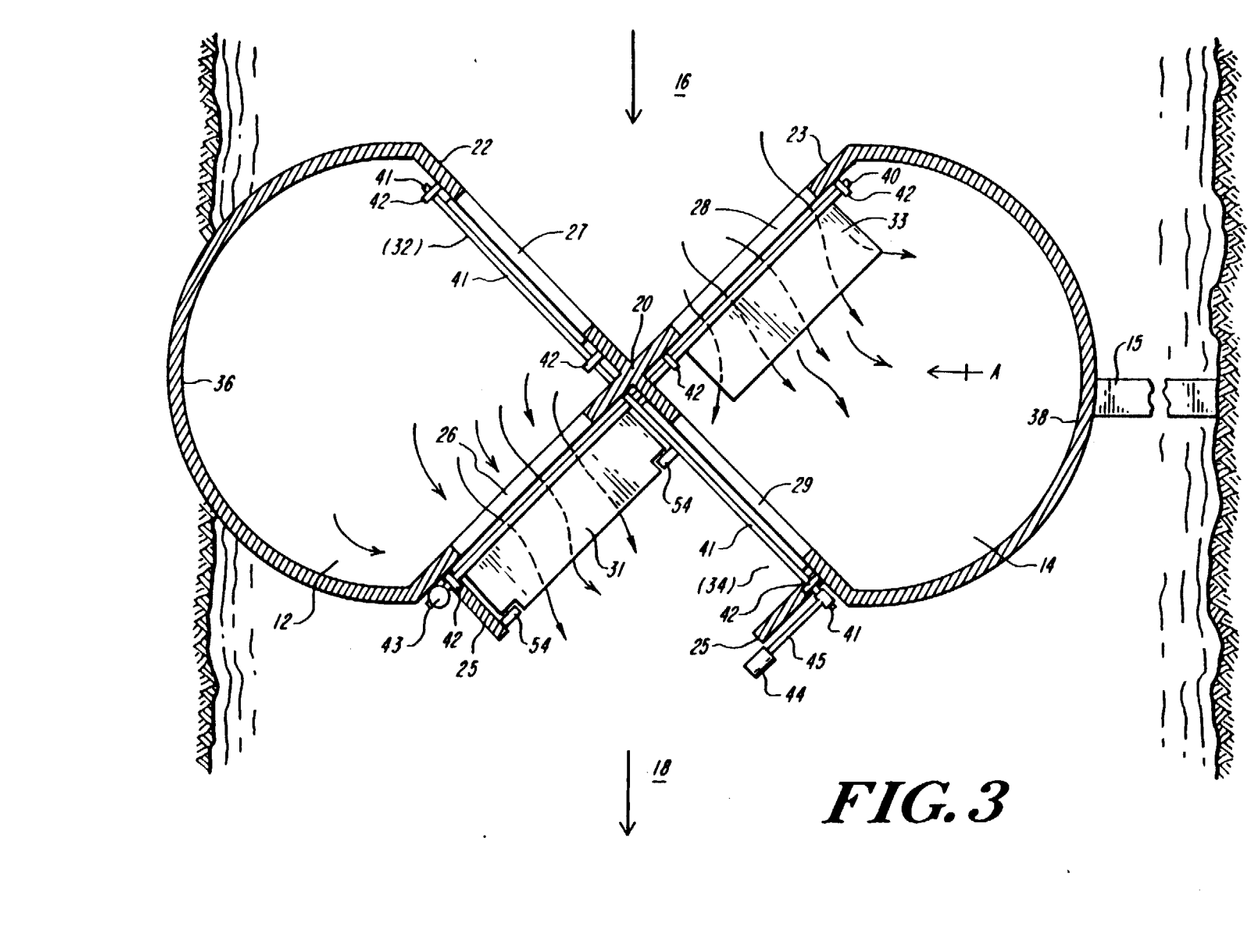
FIG. 3 is a top diagrammatic view of the chambers and gates of FIG. 1 in a second phase of operation.

As shown in FIGS. 1 and 3, wheels or rollers 54 are mounted to the outer lower edges of water gates 31 and 34. These wheels 54 permit an opening water gate 34/31 to prevent the closed gate 31/34 from opening Also shown in FIGS. 1 and 3 are vertical members 25, shown from the top, which are connected to each of the vertical walls 21 and 24. These vertical members 25 provide structural resistance to relieve pressure exerted by a closed gate 31/34 on an open gate 34/31. In FIG. 1, for example, water pressure in the first hydro-pneumatic chamber 12 exerts pressure on the water gate 31 (shown in closed position) which in turn exerts pressure upon the roller 54, water gate 34, and roller 54, which in turn exert pressure on the vertical member 25. The vertical members 25 are shown housing water-proof bearings 42 through which the shafts 40/41 are rotatably mounted. For convenience of explanation, the vertical members 25 disposed on walls 21 and 24 are not illustrated in FIGS. 2 and 4.

FIG. 2 shows a partial perspective view of the portion of the hydro-pneumatic chamber housings 12 and 14 that is located beneath the water surface. The ports are preferably rectangular in shape and of a uniform size to ensure an equal rate of water flow through the system. The housing of the first chamber 12 is defined by vertical walls 21 and 22 and wall 36, which may be either flat or curved as shown, or the wall 36 may assume any other suitable shape. Similarly, the housing of the second chamber 14 is defined by vertical walls 23 and 24 and wall 38, which may be flat or curved as shown. For example, chambers 12 and 14 may each have five sides. The four vertical walls 21-24 may be manufactured together as a unit, then further external walls of various sizes and shapes may be added in accordance with the chamber volume desired. A ceiling portion 39 (shown in FIGS. 4-6) connects to the vertical walls and curved walls 36/38 to enclose the air space above the water surface in each of the hydro-pneumatic chambers 12 and 14.

The material of the vertical walls 21-24, the external walls 36 and 38, and the ceiling surfaces 36 and 38 may comprise any material such as metal, plastic, concrete, wood, or fiber board which is treated, if necessary, to prevent corrosion or other deleterious effects of the elements. The walls and surfaces may be connected together by bolting, welding, gluing, or by any means known. The four vertical walls are preferably connected orthogonally in a general x-shape along, around, or about a vertical axis 20 to maximize the volume of the hydro-pneumatic chambers 12 and 14 and the strength of the structure as a whole. Various sized walls 21-24, 36, and 38, as well as various angles of incidence between these walls, are within the contemplation of the invention.

In an exemplary embodiment, the opening and closing of the water gates is synchronized by shafts 40 and 41. FIGS. 1-4 illustrate a complete operation cycle of the system. A first set of water gates 31 and 33 is defined and connected by a first common shaft 40. Similarly, a second set of water gates 32 and 34 is defined and connected by a second common shaft 41 which crosses the first shaft 40. As seen in FIGS. 1 and 2, the use of common shafts 40 and 41 permits synchronization of the alternating opening and closing of the sets of water gates 31/33 and 32/34. The water gates are synchronized such that water gates 32/34 located on opposite sides of the walls 21 and 23 may be in open position while the other water gates 31/33 are closed. In this condition, water flows into a first hydro-pneumatic chamber 12 through the inlet port 27, while water flows out of the second pneumatic chamber 14 through an egress port 29.

Figure 4:
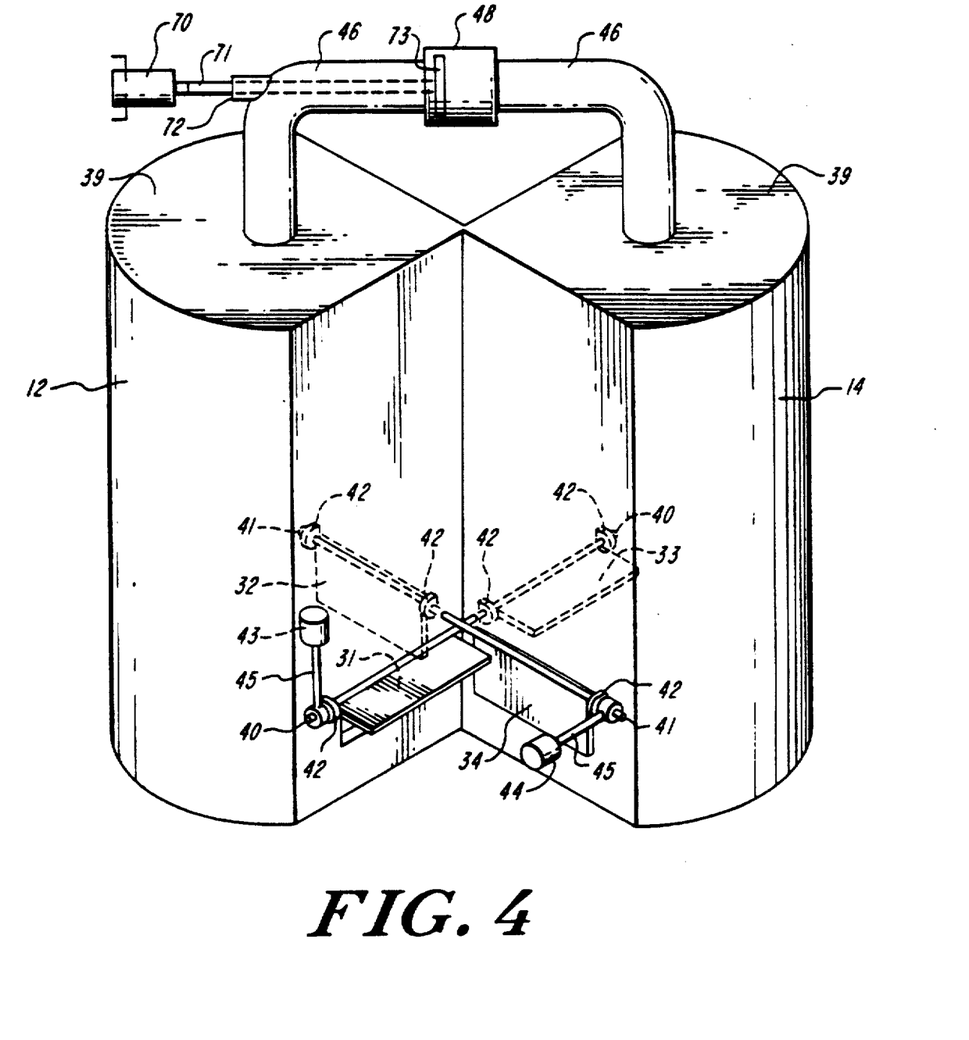
FIG. 4 is a perspective view of the gates of FIG. 1 and the hydro-pneumatic chambers having a pipe and air-turbine.

When the water level in the first chamber 12 equals the higher water level 16 and the water level in the second chamber 14 equals that of the lower water level 18, the second phase of operation, as shown in FIGS. 3-4, may begin. Consequently, the set of water gates 32/34 are closed by a counterweight 44 attached to the common shaft 41, and the other set of water gates 31/33 are permitted to open by the natural force of the water level differential; thus, as shown in FIG. 3, water flows into the second hydro-pneumatic chamber 14 through the inlet port 28, while water flows out of the first hydro-pneumatic chamber 12 through egress port 26. When the water level in the second chamber 14 equals that of the higher water level 16, and the water level in the first chamber 12 equals that of the lower water level 18, the water gates 31/34 are closed by a counterweight 43 attached on the shaft 40. Water gates 32/34 are then permitted to open by the natural force of the water level differential and the cycle is repeated.

Figure 5:
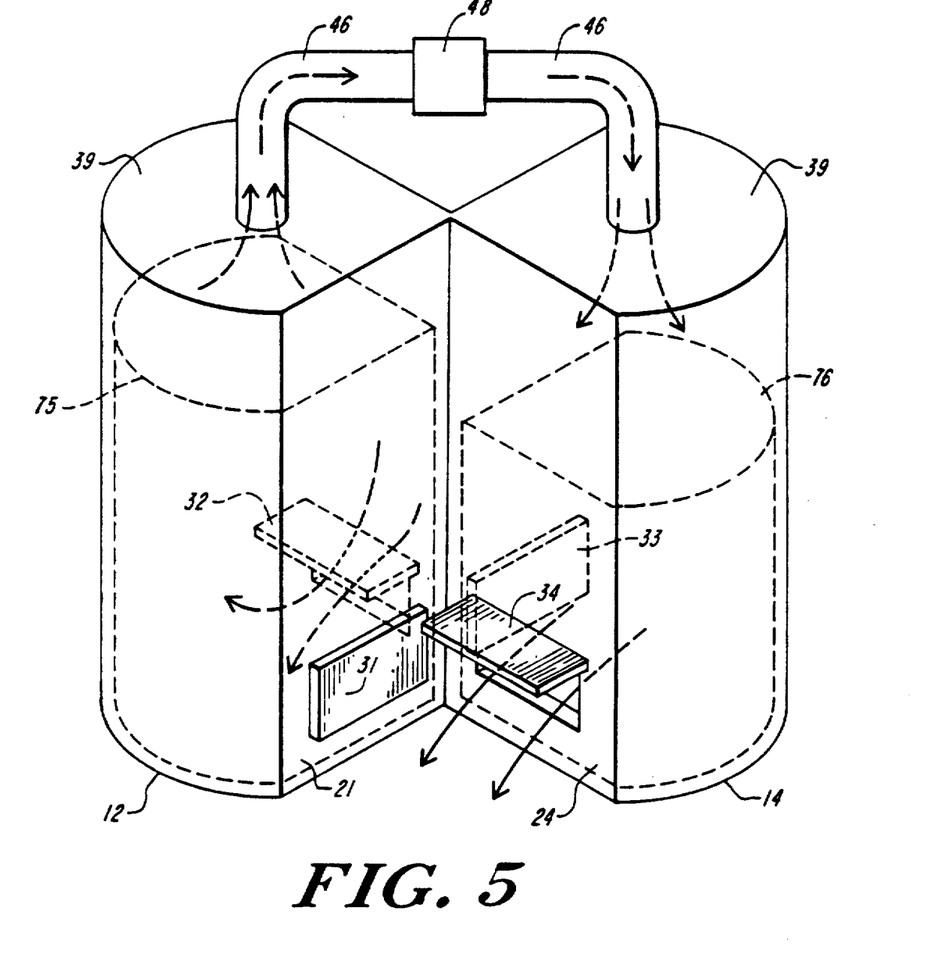
FIGS. 5 and 6 are perspective diagrammatic views of the hydro-pneumatic chambers and water levels therein.
Figure 6:
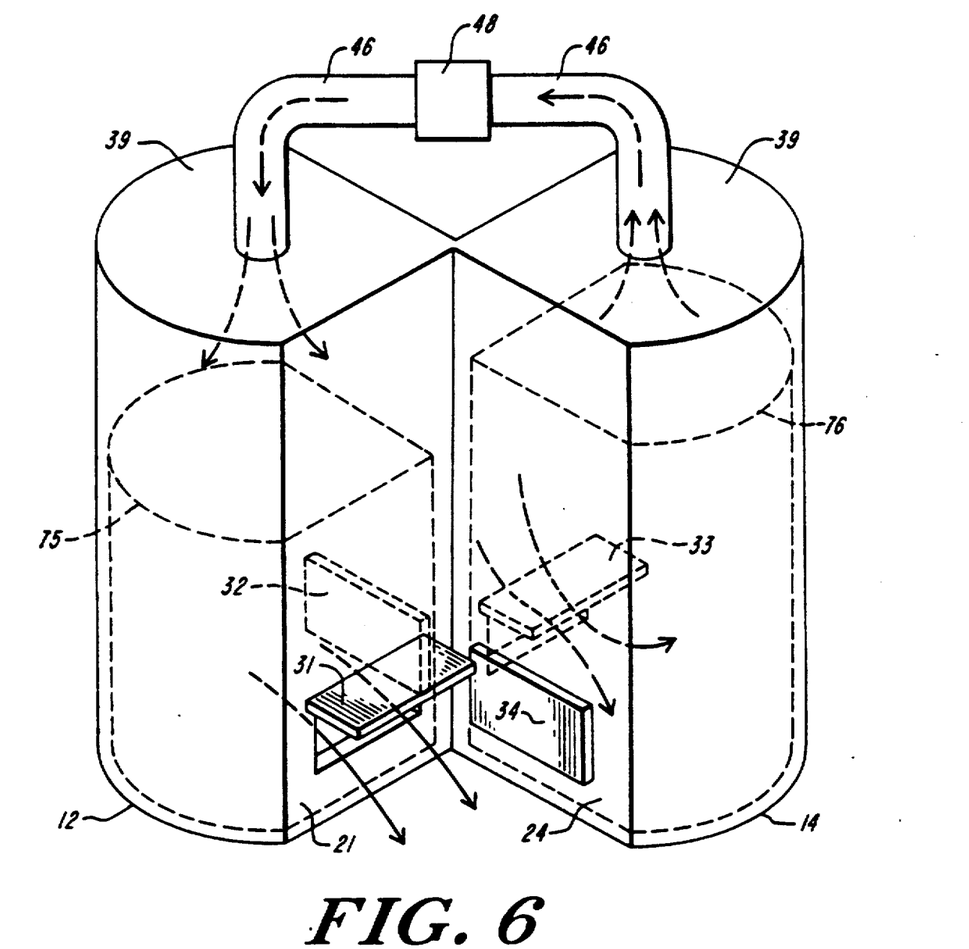

As a result of the cross-synchronized operation of the water gates 31/33 and 32/34, the water level in one of the two hydro-pneumatic chambers rises, while the water level in the other chamber falls. This is illustrated in FIGS. 5 and 6. While air pressure is built up in the first hydro-pneumatic chamber 12 by the water level rising 75 therein, a partial vacuum is created in the second hydro-pneumatic chamber 14 by the water level falling 76 therein, as shown in FIG. 5. After the opened gates are closed and closed gates are opened, the water level 75 in the first chamber 12 falls and creates a partial vacuum, while the water level 76 in the second chamber 14 rises and builds pressure, as shown in FIG. 6. A pipe, tube, or channel 46 which connects the hydro-pneumatic chambers 12 and 14 permits air to move back and forth between the chambers 12 and 14.

The air jet movement is essentially doubled by the pressure generated in one chamber and the vacuum created in the other, and the energy of this air jet can be harnessed by an air turbine 48 which, as shown in FIG. 4, may comprise an electrical generator 70 connected by a shaft 71 to a rotor 73 located within the pipe 46. The electrical generator 70 is located outside of the pipe 46 by the shaft 71 which is surrounded by an air tight seal 72 at the pipe surface. A Wells type rotor is a good example of the kind of turbine equipment which may be employed because it rotates in one direction even in a reversing air flow.

The use of the two chambers in the present invention has an advantage over prior art designs in which only one chamber is used because the air jet which is harnessed by the pipe/turbine 46/48 is effectively doubled. In addition to the air turbine, a piston-and-pushrod or other device may be used to harness the energy of the air jet within the pipe or channel 46.

The common shafts 40 and 41 which connect the opposing sets of water gates are preferably of tubular cross-sectional shape and comprised of strong material such as steel, aluminum, plastic or other desirable materials. The shafts may be solid or hollow, depending upon the strength needed to withstand the force of water pressure on the water gate. Water-proof bearings 42 permit the shafts to be rotatably mounted through or to the vertical walls 21 and 24 or upon holding structures (such as shown at 25 in FIGS. 1 and 3) attached or integrally molded to the vertical walls 21 and 24. A variety of known water-proof bearings can be used for this purpose.

Figure 7:
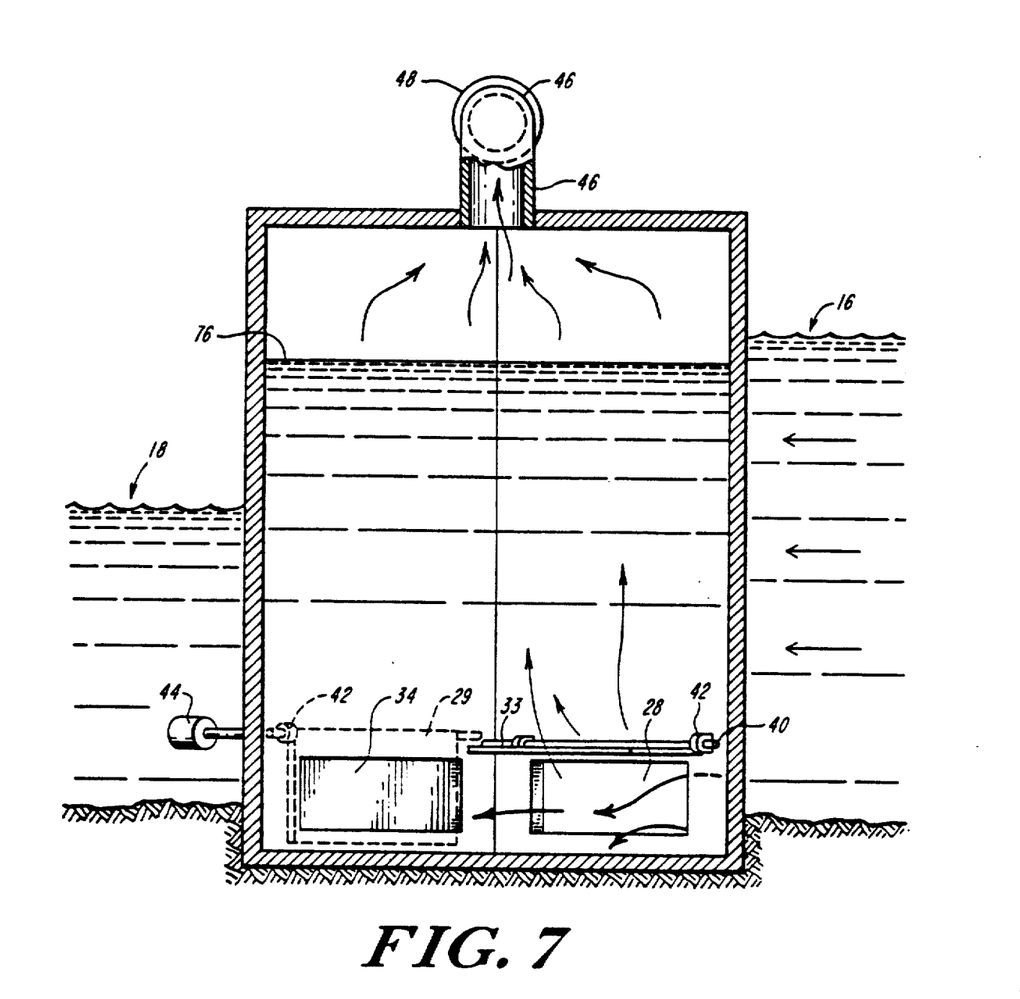
FIG. 7 is a sectional view along direction A of FIG. 3.

FIG. 7 is a partial sectional view of the system shown along direction A of FIG. 3. The water level 76 within the second hydro-pneumatic chamber 14 rises towards the upper water level 16 as water flows inward through the ingress port 28. The corresponding water gate 33 is in an open position. The water in the chamber 14 is prevented from flowing out through the egress port 29 by the water gate 34. The air compressed by the rising water level rushes up through the tube or passageway 46 connected at or near the top of the chamber 14 and through the air turbine 48.

Figure 8:
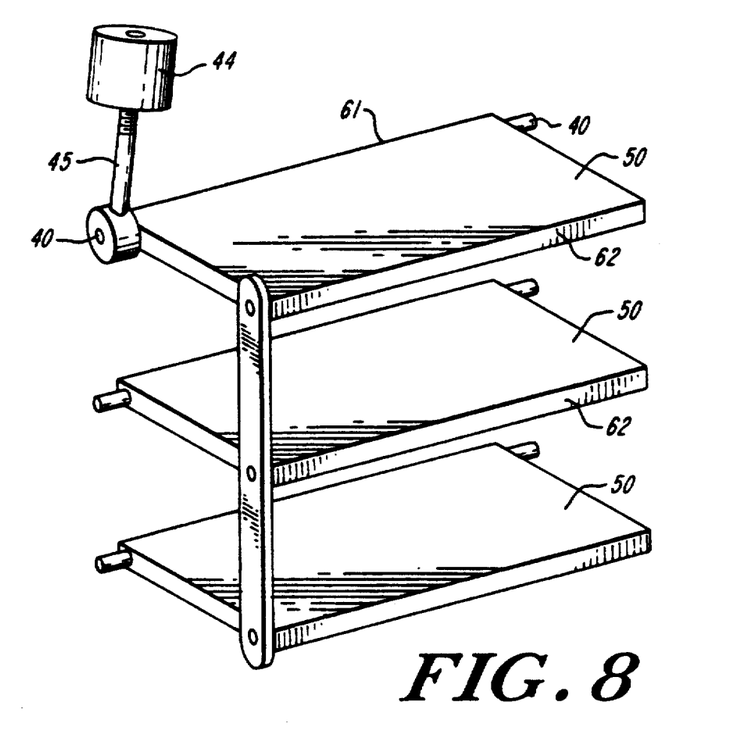
FIG. 8 is a perspective view of a water gate comprised of a plurality of ganged louvers.

In another exemplary embodiment shown in FIG. 8, each water gate may comprise a plurality of slats or louvers 50 in a jalousy arrangement operative for simultaneous opening and closing of the water ports. The louvers 50 may be ganged by a vertical rod 52. Thus, the plurality of louvers 50 which comprise the water gate 31 may be simultaneously connected and moveable by means of a vertical rod 52 hinged to the outer edge of the louvers 50. As in the embodiments described above, the counter weight 44 (also 43) is preferably attached orthogonally to the plane of the water gate louver 50 so that when the louver 50 is in open position, the counter weight 44 has minimal moment. The cumulative weight of the water gate louvers 50, as well as the weight of the counter weight 44/43 and the distance the counter weight is mounted from the shaft 40 (also 41), depends upon the volume of water expected to flow into and out of the chambers.

The plurality of louvers 50 may be connected by cables or by any other means known. If the louvers are connected to the common shafts (40/41) or other shafts at a point below their upper edge 61, cables can be used to link all lower edges 62 together and all upper edges 61 together, so that the louvers can be opened and closed at the same time.

Figure 9:
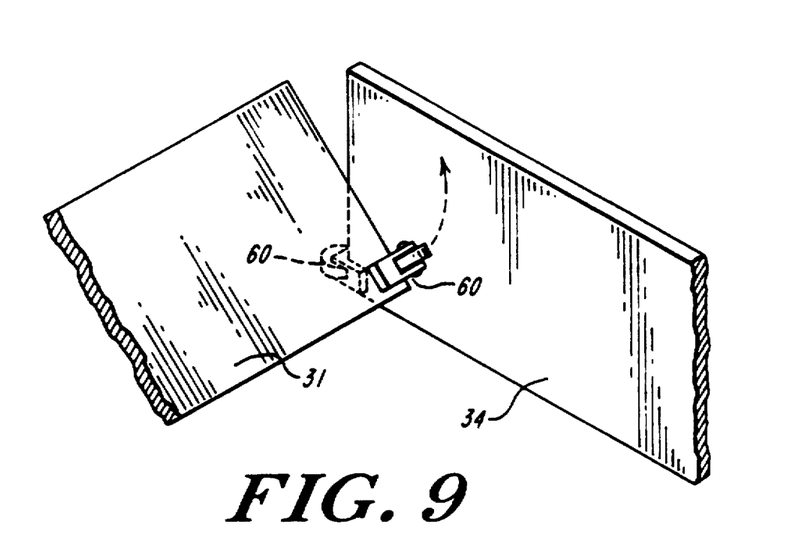
FIG. 9 is a partial illustration of wheels mounted on open and closed water gates.

FIG. 9 is an enlarged view of wheel or roller mechanisms 60 which may be attached to water gates 31 and 34 to facilitate the opening of one set of gates and the preventing of the other set of gates from opening. The rollers 60 may be made of plastic, metal, or other materials which are relatively resistant to the corrosive effects of water.

Figure 10:
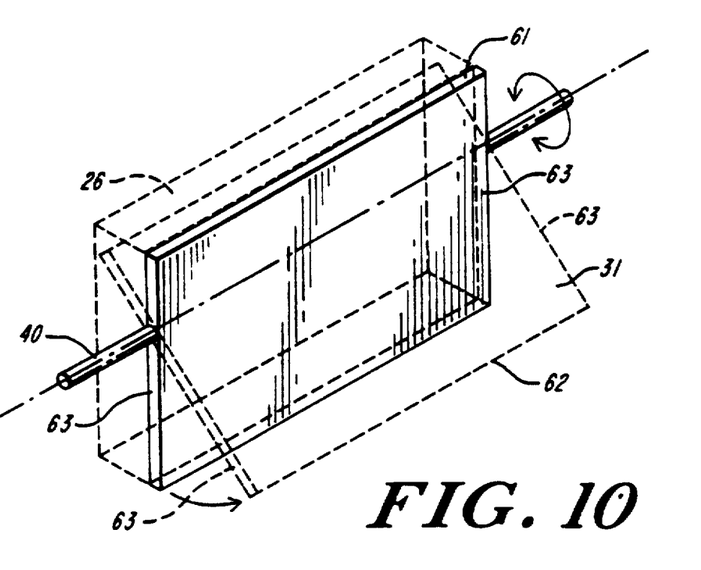
FIG. 10 is an illustration of an exemplary embodiment of a water gate louver.

FIG. 10 shows an exemplary embodiment of the invention wherein the water gate 31, which has a top edge 61, bottom edge 62, and side edges 63, is mounted so as to decrease the force needed to turn the shaft 40. The water gate louver 50 is hinged along a horizontal axis below the top edge 61 to permit the top edge to be rotated in a direction opposite to the bottom edge 62. Thus, high water pressure can be managed by mounting louvers slightly above their midpoints on the shafts; in this way, the water gate louvers become easier to close and less inclined to open until the requisite water pressure is achieved on the upstream side of the water gates. FIG. 10 further illustrates that the water gate 31 may be sized to fit flush within the dimensions of the port 26 in which it is disposed.

Figure 11:
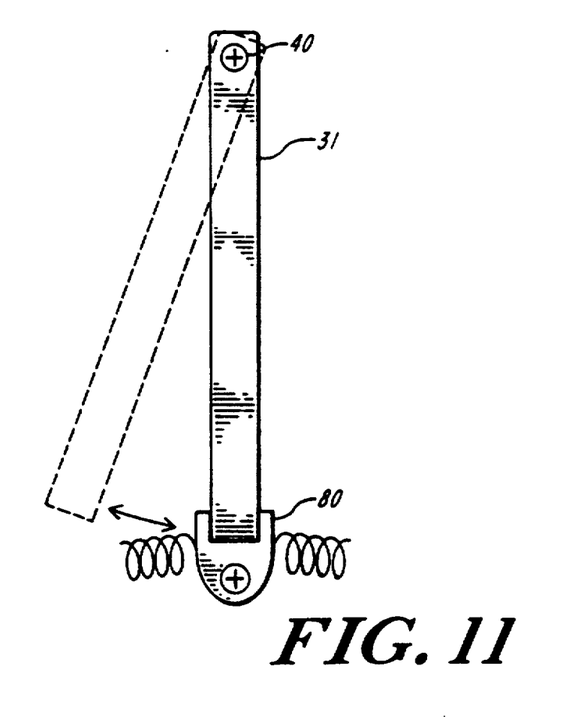
FIG. 11 is a side view of an automatic gate locking mechanism.

In a further exemplary embodiment of the invention, as shown in FIG. 11, the closing of the water gates is achieved by virtue of their own weight, and opening of the gates is provided by the water pressure on a gate 31 having a latch, lock, or other device 80 which unlocks at a predetermined point such as when a certain water level or pressure is reached in one of the chambers. A variety of latching mechanisms can be used. For example, the latch 80 may be comprised of a U-shaped member which is rotatable about an axis parallel to the shaft 40 upon which the gate 31 is mounted. The member may be spring-loaded to snap the engaged gate 31 shut or open. Another example of a control locking system is described in U.S. Pat. No. 4,464,080 at Col. 9, line 14 through Col. 10, line 10, and in FIGS. 11A and 11B therein.

As it will be known to those skilled in the art that modifications of the invention can be practiced within the spirit of the invention, the scope of the invention is limited only by the scope of the claims.

It is claimed:

1. A system for harnessing the energy of current flow or tidal motion of a water body, comprising:
    two hydro-pneumatic chambers each having an inlet port for the ingress of water into the chamber below the water surface and an outlet port for the egress of water out of the chamber below the water surface;
    a water gate disposed at each of said ports and rotatable between open and closed positions along a horizontal axis;
    a linkage between said inlet port water gate of each one of said chambers and said outlet port water gate of the other of said chambers, such that one set of water gates is in an open position and the other set of water gates is in a closed position, and water is permitted to flow into an inlet port of one chamber while water is permitted to flow out of the outlet port of the other chamber, thereby allowing air pressure to build up in one chamber while allowing a partial vacuum to be created in the other;
    a channel connecting said chambers above the water surface and operative to permit air to move between said chambers; and
    means for harnessing the energy of the air moving within said channel.

2. The system of claim 1 wherein said hydro-pneumatic chambers are defined and separated by four vertical walls, said inlet ports disposed in two of said vertical walls, and said outlet ports disposed in the other two of said vertical walls.

3. The system of claim 2 wherein said four vertical walls are connected orthogonally about a vertical axis and have a general x-shape.

4. The system of claim 2 wherein each of said hydro-pneumatic chambers further comprises: a wall connected to one of said walls containing an inlet port and to one of said walls containing an outlet port; and a top portion operative to enclose the space within said walls above the surface of the water within each of said chambers.

5. The system of claim 1 wherein said ports are rectangular in shape.

6. The system of claim 1 wherein said water gates are sized to cover said ports when said gates are in the closed position.

7. The system of claim 1 wherein said water gates are sized to fit flush within said ports when said gates are in the open position.

8. The system of claim 1 wherein said water gates are each comprised of at least one slat having a top edge, a bottom edge, and side edges.

9. The system of claim 8 wherein said slats are rotatable along an axis coincident with said top edge.

10. The system of claim 8 wherein said slats are rotatable along an axis which is below said top edge, such that the force required to move the slat is decreased.

11. The system of claim 1 wherein each said set of water gates is linked by a shaft.

12. The system of claim 11 wherein a common shaft of each set of water gates further includes a counterweight upon said shaft in a generally orthogonal manner with respect to the water gate.

13. The system of claim 1 wherein each said water gate is comprised of a plurality of slats horizontally and simultaneously moveable between an open position and a closed position.

14. The system of claim 13 wherein said plurality of slats is ganged by means of a rod.

15. The system of claim 13 wherein said plurality of slats is ganged by means of cables.

16. The system of claim 1 further comprising wheels mounted on each of said water gates disposed at said outlet ports, said wheels operative to prevent a water gate from opening.

17. The system of claim 1 wherein said linkage of each of said sets of water gates further comprises a counterweight operative to move said water gates to a closed position when water levels in said chambers are equilibrated with respective levels of the water body to which they are connected through an open port.

18. The system of claim 1 wherein said means for harnessing the energy of the air moving within said channel comprises an air turbine.

19. The system of claim 1 wherein the water gates are moved between open and closed positions by the natural movement in the water body.

20. The system of claim 1 further comprising at least one latch operative for automatically locking a water gate.

21. A system for harnessing the energy of tidal movement or current flow in a water body separated into a higher water level and lower water level, comprising:

four vertical walls connected about a vertical axis, each containing a port operative to permit passage of water below the water surface;

a water gate corresponding to each of said ports, each said water gate moveable along a horizontal axis between open and closed positions;

a first housing defining a first chamber between a pair of adjacent walls of said four walls;

a second housing defining a second chamber between the other pair of said four walls; at least two couplers defining two sets of gates, the first set operative when in the open position to permit water from a higher water level to enter said first chamber and to permit water from said second chamber to enter into a lower water level, and the second set operative when in the open position to permit water from a higher water level to enter said second chamber and to permit water from said first chamber to enter into a lower water level; and a channel connecting said first and second housings, said channel operative to permit the movement of air between said housings; and means for converting the movement of air in said channel into usable energy.

22. The system of claim 21 wherein each of said water gates is comprised of a plurality of simultaneously moveable louvers.

23. The system of claim 21 wherein the water gates are moved between open and closed positions by the natural movement in the water body.

* * * * *

UNITED STATES PATENT AND TRADEMARK OFFICE
CERTIFICATE OF CORRECTION

PATENT NO.   :   5,074,710

DATED        :   December 24, 1991

INVENTOR(S)  :   Alexander M. Gorlov

It is certified that error appears in the above-identified patent and that said Letters Patent is hereby corrected as shown below:

Abstract

Item [57], line 4, "and egress below" should read
--and egress ports below--.

Column 1, line 5, before the "FIELD OF THE INVENTION" heading insert, --The Government has rights in this invention pursuant to contract number DEFG02-91ER-12113 awarded by the Department of Energy.--

Column 1, line 19, "devices as" should read --devices such as--.

Signed and Sealed this

Fourteenth Day of September, 1993

Attest:

BRUCE LEHMAN

*Attesting Officer*                *Commissioner of Patents and Trademarks*